US012106656B2

(12) United States Patent
S B et al.

(10) Patent No.: US 12,106,656 B2
(45) Date of Patent: Oct. 1, 2024

(54) ALARM SYSTEM STATES

(71) Applicant: Honeywell International Inc., Charlotte, NC (US)

(72) Inventors: Mahadevan S B, Chennai (IN); Rajeshbabu Nalukurthy, Atlanta, GA (US); Hemantha Kumar Reddyvaari, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 107 days.

(21) Appl. No.: 17/874,735

(22) Filed: Jul. 27, 2022

(65) Prior Publication Data

US 2024/0038048 A1 Feb. 1, 2024

(51) Int. Cl.
*G08B 21/18* (2006.01)

(52) U.S. Cl.
CPC .................................. *G08B 21/182* (2013.01)

(58) Field of Classification Search
CPC .................................................... G08B 21/182
USPC ..................................................... 340/539.11
See application file for complete search history.

(56) References Cited

U.S. PATENT DOCUMENTS 9,628,975 B1 * 4/2017 Watkins ................ H04W 4/027
2008/0197999 A1 * 8/2008 Henderson ........... G08B 17/125 340/521
2008/0284580 A1 11/2008 Babich
2013/0033379 A1 * 2/2013 Jentoft ................. G08B 29/181 340/541
2015/0161882 A1 * 6/2015 Lett ...................... G08B 25/001 340/506
2015/0343141 A1 * 12/2015 Lindo ............... A61M 5/16827 604/67
2017/0018168 A1 * 1/2017 Beernink ................. G08B 7/06
2017/0084160 A1 * 3/2017 Piccolo, III .......... G08B 25/001
2017/0372597 A1 * 12/2017 Saintellemy ........... G08B 29/16

(Continued)

FOREIGN PATENT DOCUMENTS

CN 201917990 U 8/2011
CN 212282596 U 1/2021
WO 2018203229 A1 11/2018

OTHER PUBLICATIONS

Kong, et al., "Improvement of Fire Alarm Systems: With a Focus on Apartment"; International Journal of Smart Home, vol. 10, No. 11 (2016) (10 pgs).

(Continued)

*Primary Examiner* — Zhen Y Wu
(74) *Attorney, Agent, or Firm* — Brooks, Cameron & Huebsch, PLLC

(57) ABSTRACT

Devices, systems, and methods for alarm system states are described herein. In some examples, one or more embodiments include a mobile device comprising a memory and a processor to execute instructions stored in the memory to receive a notification from a remote computing device that an event device in an alarm system has detected an event, where in response to the alarm system detecting the event, the alarm system is in a conditional state, acknowledge the event to cause the alarm system to remain in the conditional state, and transmit a signal to the remote computing device indicating whether the event is a true event or a false event, the mobile device further including a user interface configured to display the notification.

17 Claims, 4 Drawing Sheets

(56) References Cited

U.S. PATENT DOCUMENTS

| | | | | |
|---|---|---|---|---|
| 2018/0286210 | A1* | 10/2018 | Frascati-Robinson | G08B 25/08 |
| 2020/0232737 | A1* | 7/2020 | McClellan | F41G 3/06 |
| 2021/0209929 | A1 | 7/2021 | Darling | |
| 2021/0313076 | A1* | 10/2021 | Jho | G16H 80/00 |
| 2022/0023626 | A1* | 1/2022 | Haddad | A61N 1/39622 |
| 2022/0165144 | A1* | 5/2022 | De Haes | G08B 7/06 |
| 2022/0280047 | A1* | 9/2022 | Stadler | A61N 1/3993 |

OTHER PUBLICATIONS

Technical Support Group, "Paano ba ang Positive Alarm Sequence mula sa NFPA 72"; Premiered Jun. 5, 2021 (Duration 3:53) (Screen Shot/Cover Page-1 pg) https://www.youtube.com/watch?v=2V3WR21pTSM.

* cited by examiner

ALARM SYSTEM STATES

TECHNICAL FIELD

The present disclosure relates to devices, systems, and methods for alarm system states.

BACKGROUND

Facilities, such as commercial facilities, office buildings, hospitals, campuses (e.g., including buildings and outdoor spaces), and the like, may have an alarm system that can be triggered during an event, such as an emergency situation (e.g., a fire) to warn occupants to evacuate. Such an alarm system may include a control panel and/or a number of event devices and/or alarm devices located throughout the facility (e.g., on different floors and/or in different rooms of the facility) that can perform an action when an event is occurring in the facility and provide a notification of the event to a user (e.g., a building/facility manager) and/or the occupants of the facility via visible means, audible means, or other mechanisms.

DETAILED DESCRIPTION

Figure 1:
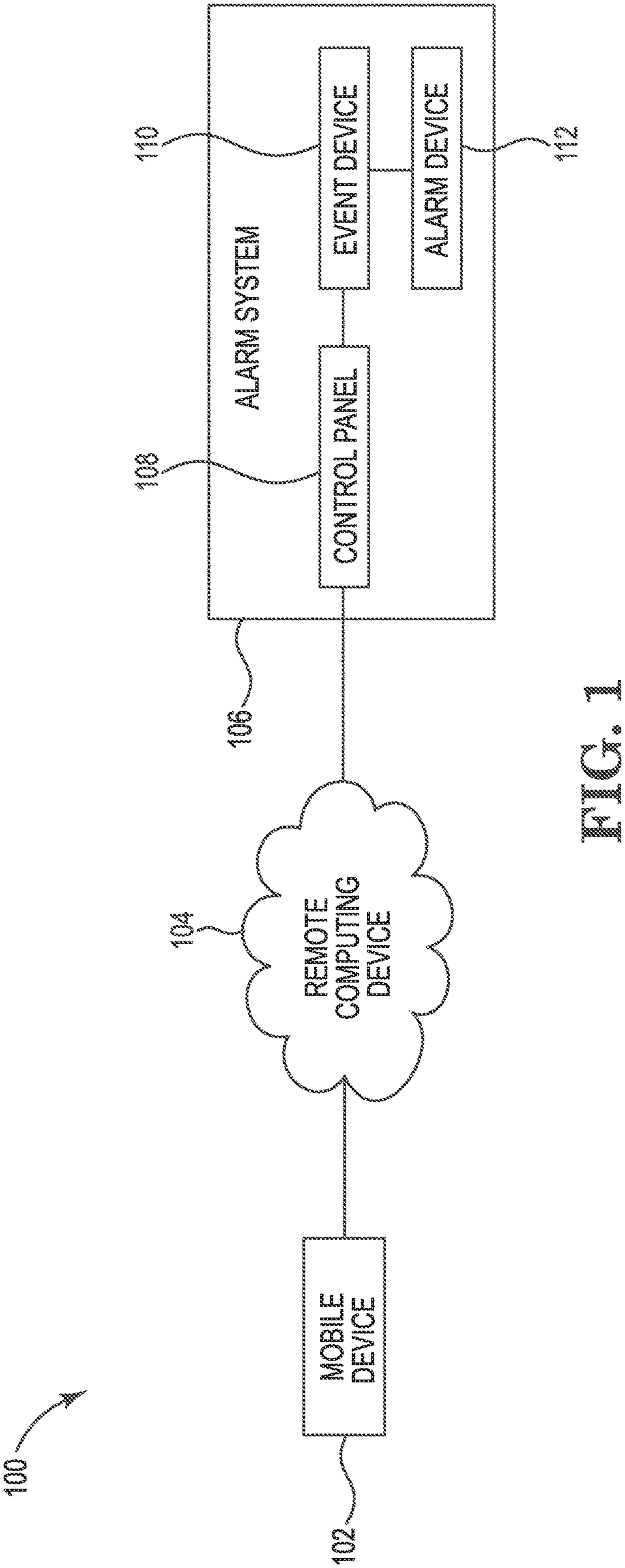
FIG. 1 is an example of a system for alarm system states, in accordance with one or more embodiments of the present disclosure.

Devices, systems, and methods for alarm system states are described herein. In some examples, one or more embodiments include a mobile device comprising a memory and a processor to execute instructions stored in the memory to receive a notification from a remote computing device that an event device in an alarm system has detected an event, where in response to the alarm system detecting the event, the alarm system is in a conditional state, acknowledge the event to cause the alarm system to remain in the conditional state, and transmit a signal to the remote computing device indicating whether the event is a true event or a false event, the mobile device further including a user interface configured to display the notification.

Facilities can include various alarm systems. Such alarm systems can include security systems, emergency systems, alarm response systems, etc. Such alarm systems may include event devices such as cameras, motion sensors, fire sensors, smoke detectors, heat detectors, carbon monoxide (CO) detectors, and/or combinations of these; interfaces; manual call points (MCPs), pull stations; input/output modules; aspirating units; sprinkler controls; and/or audio/visual devices (e.g., speakers, microphones, cameras, video displays, video screens, etc.), relay output modules, among other types of event devices. In some examples, such alarm systems may further include alarm devices (e.g., sounders, flashers, buzzers, etc.).

When an event is detected, a delay method may be utilized in order to prevent raising an alarm when the event is a "false event". A false event (e.g., a false alarm) can be, for example, an instance where an event device erroneously detects an event when no such event exists. Such a false event may be the result of the event device having a fault (e.g., a sensor is faulty), erroneous installation, faulty setup (e.g., detection thresholds are not set correctly), short circuit, etc.

Certain delay methods may be utilized to prevent raising an alarm during a false event, such as Positive Alarm Sequence (PAS) delay methods, Pre-Signal delay methods, two-stage alerts, etc. In such methods, a time delay (or a series of multiple time delays) may be implemented in between detection of an event and emitting an alarm. Such a time delay can allow a user to acknowledge and silence an event, preventing an alarm from being emitted in the facility if the event is a false event. For example, an event device may detect an event and notify a control panel of the detection, a user can acknowledge the event detection, and verify whether the event is a true event or a false event within particular time delay(s). Similar delay methods may be utilized during installation, commissioning, and/or maintenance of the alarm system as well.

However, during installation, commissioning, and/or maintenance of the alarm system, typically a first user monitors the control panel while a second user tests the event device. Additionally, during normal operation, the first user monitors the control panel while the second user determines whether the detected event is a true event or a false event. Such an approach relies on multiple users. Additionally, in certain facilities, it may be difficult for the second user to reach the site of the event device to verify the event as being a true event or a false event, especially in larger facilities as it may take some time to transit from the user's location to the location of the event device. In such a case, a false event may cause the alarm system to emit an alarm when not necessary (e.g., no emergency event is occurring). The emitted alarm may result in the occupants of the facility evacuating unnecessarily, which can lead to loss in time and productivity of the occupants in the facility.

Alarm system states, according to the present disclosure, can allow for a user to utilize a mobile device acknowledge a detected event. Acknowledgment of a detected event via the mobile device within a first threshold time limit can allow for a user of the mobile device to transit to the location of the detected event and verify whether the event is a true event or a false event within a second threshold time limit. If the event is a false event, the user can utilize the mobile device to prevent the alarm system from sounding an alarm. If the event is a true event, the user can utilize the mobile device to notify the alarm system as such and the alarm system can sound an alarm. Such an approach can utilize an easy and efficient interface via a mobile device to prevent the alarm system from emitting alarms during a false event, leading to less losses in time and productivity for occupants of a facility, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 402 in FIG. 4.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system for alarm system states, in accordance with one or more embodiments of the present disclosure. The system 100 can include a mobile device 102, a remote computing device 104, and an alarm system 106.

As mentioned above, the system 100 can be included in a facility, a space in a facility, etc. The system 100 can include an alarm system 106. The alarm system 106 can include a device/series of devices in order to detect events and/or process and/or analyze the detected events to determine whether to generate an alarm for occupants of the facility.

The alarm system can include an event device 110. The event device 110 can be a device to detect an event and transmit the detected event for processing and/or analysis. As mentioned above, the event device 110 can include, for example, cameras, motion sensors, fire sensors, smoke detectors, heat detectors, carbon monoxide (CO) detectors, or combinations of these; interfaces; manual call points (MCPs), pull stations; input/output modules; aspirating units; sprinkler controls; and/or audio/visual devices (e.g., speakers, microphones, cameras, video displays, video screens, etc.), relay output modules, among other types of event devices.

The alarm system can further include an alarm device 112. The alarm device 112 can be a device that can emit an indication for an alarm. The indication can be, for example, a visual indication, and audible indication, etc. As mentioned above, the alarm device 112 can include, for example, sounders, flashers, buzzers, etc.

Although the event device 110 and the alarm device 112 are illustrated in FIG. 1 as being separate devices, embodiments of the present disclosure are not so limited. For instance, in some examples, the event device 110 and the alarm device 112 can be a single device.

Although the alarm system 106 is illustrated in FIG. 1 as including a single event device 110 and a single alarm device 112, embodiments of the present disclosure are not so limited. For example, the alarm system 106 can include more than one event device 110 and/or more than one alarm device 112.

The alarm system can further include a control panel 108. The control panel 108 can be utilized to control the various devices included in the alarm system 106, including the event device 110 and/or the alarm device 112.

The control panel 108 can be connected to the remote computing device 104. Although not illustrated in FIG. 1 for clarity and so as not to obscure embodiments of the present disclosure, the control panel 108 may be connected to the remote computing device 104 via a building system gateway. The building system gateway can be a device that provides a communication link between the control panel 108 for event device 110, alarm device 112, remote computing device 104, and peripheral devices. For example, the building system gateway can enable transmission of data from the control panel 108 of the facility to a cloud computing platform (e.g., the remote computing device 104), as well as accessibility to the control panel 108 by a peripheral device (e.g., a mobile device 102). Additionally, the building system gateway can allow for the mobile device 102 to access and/or determine information about the event device 110 and/or the alarm device 112 of the alarm system 106.

The mobile device 102 can be included in the system 100. As used herein, a mobile device can include devices that are (or can be) carried and/or worn by the user. Mobile device 102 can be a phone (e.g., a smart phone), a tablet, a personal digital assistant (PDA), a laptop, smart glasses, and/or a wrist-worn device (e.g., a smart watch), among other types of mobile devices. Although not illustrated in FIG. 1 for clarity and so as not to obscure embodiments of the present disclosure, the mobile device 102 can include a user interface, as is further described in connection with FIGS. 3 and 4.

As illustrated in FIG. 1, the mobile device 102 and the alarm system 106 (e.g., via the control panel 108) can be connected to the remote computing device 104. The mobile device 102 and the alarm system 106 can be connected to the remote computing device 104 via a wired and/or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

During operation of the alarm system 106, the alarm system 106 can include various system states. The various system states can describe the condition of the alarm system. Such system states can include a normal state, a conditional state, and an alarm state. In the normal state, the event device 110 has not detected any events and the alarm device 112 is not emitting an alarm indicator (e.g., the alarm device 112 is off). In the conditional state, the event device 110 has detected an event and the alarm device 112 is not emitting an alarm indicator (e.g., the alarm device 112 is off). In the alarm state, the event device 110 has detected an event and the alarm device 112 is emitting an alarm indicator (e.g., the alarm device 112 is turned on and emitting an audible and/or visual alarm indicator). The various system states can change based on whether the event device 110 has detected an event, as is further described herein.

As mentioned above, the event device 110 of the alarm system 106 in the facility can detect events, such as a fire event. In response to the event device 110 detecting an event, the control panel 108 can transition the alarm system 106 from the normal state to the conditional state. The control panel 108 can transmit and the remote computing device 104 can receive a notification from the control panel 108 in response to the event device 110 detecting the event. The notification can be, for example, a signal carrying data from one device to another. The notification can include data including an event device 110 has detected an event, which event device detected the event, the type of event, etc. Additionally, the alarm system 106 can remain in the conditional state for a first predetermined period of time, while the transition to the conditional state can cause a first timer to be started for the mobile device 102 to acknowledge the detected event within the first predetermined period of time, as is further described in connection with FIG. 2. The first timer can be hosted at the control panel 108, at the remote computing device 104, and/or at the mobile device 102.

The mobile device 102, in response to the remote computing device 104 receiving the notification from the control panel 108, can receive the notification from the remote computing device 104 that the event device 110 has detected the event. Although not illustrated in FIG. 1 for clarity and so as not to obscure embodiments of the present disclosure, the mobile device 102 can include a user interface. In response to receiving the notification from the control panel 108, the mobile device 102 can display a prompt on the user interface for a user to acknowledge the event detected by the event device 110.

The mobile device 102 can, in response to receiving a user input to acknowledge the event, acknowledge the event to cause the alarm system 106 to remain in the conditional state. The alarm system 106 can remain in the conditional state for a second predetermined period of time. For example, the acknowledgment of the event can cause a second timer to be started for the mobile device 102. The user of the mobile device 102 can transit to the location of the event device 110 to determine whether the detected event is a true event or a false event and transmit a signal indicating the same within the second predetermined period of time, as is further described in connection with FIG. 2. The second timer can be hosted at the control panel 108, at the remote computing device 104, and/or at the mobile device 102.

Once a user arrives at the location of the detected event, the user can determine whether the event is a true event (e.g., an actual fire is occurring) or a false event (e.g., no fire is occurring and therefore is a "false alarm"). When the user arrives at the location, the mobile device 102 can display a prompt on the user interface for a user to indicate whether the event is a true event or a false event. Upon selection by a user via the user interface, the mobile device 102 can transmit a signal to the remote computing device 104 indicating whether the event is a true event or a false event.

In response to the event being a true event, the mobile device 102 can transmit a true event signal to the remote computing device 104. The true event signal can include data indicating the user has determined the event to be a true event (e.g., a fire is occurring). Accordingly, the remote computing device 104 can transmit the true event signal to the control panel 108 to cause the control panel 108 to transition the alarm system 106 from the conditional state to the alarm state.

In the alarm state, the control panel 108 can cause the alarm device 112 to emit an alarm. Such an alarm can be, for example, a visible alarm, audible alarm, and/or combinations thereof. For example, the alarm device 112 can be a flasher, sounder, buzzer, etc. The alarm can allow for occupants of the facility to evacuate the facility due to the true event occurring in the facility (e.g., a fire).

In response to the event being a false event, the mobile device 102 can transmit a false event signal to the remote computing device 104. The false event signal can include data indicating the user has determined the event to be a false event (e.g., a fire is not occurring). Accordingly, the remote computing device 104 can transmit the false event signal to the control panel 108 to cause the control panel 108 to transition the alarm system 106 from the conditional state to the normal state. Utilizing alarm system states according to the present disclosure, the user can prevent occupants of the facility from being unnecessarily evacuated due to a false event (e.g., a false alarm) occurring in the facility.

Figure 2:
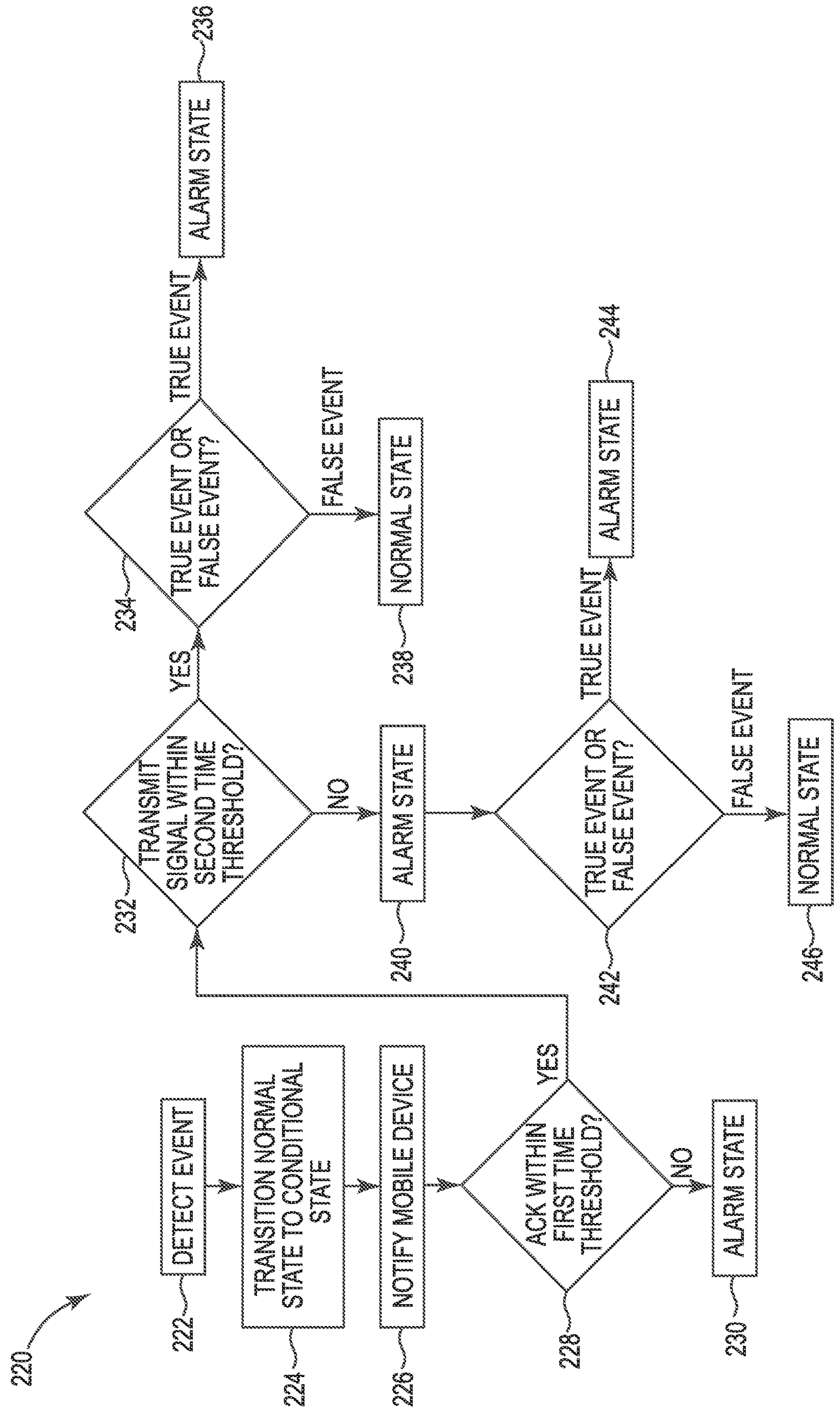
FIG. 2 is an example of a flowchart of a method for alarm system states, in accordance with one or more embodiments of the present disclosure.

FIG. 2 is an example of a flowchart of a method 220 for alarm system states, in accordance with one or more embodiments of the present disclosure. The method 220 can be performed by a mobile device, a remote computing device, and an alarm system (e.g., mobile device 102, remote computing device 104, and alarm system 106, previously described in connection with FIG. 1).

As previously described in connection with FIG. 1, an alarm system can include a control panel, an event device, and/or an alarm device. The alarm system can be connected to a remote computing device, and a mobile device can be connected to the remote computing device for alarm system states, as is further described herein.

At 222, the method 220 includes detecting an event by the event device. At 224, the control panel can transition the alarm system from a normal state to a conditional state in response to the event device detecting the event. At 226, the mobile device can be notified of the event device detecting the event. For example, the control panel can transmit a notification to the remote computing device that the event device detected an event, and the remote computing device can receive the notification from the control panel. Accordingly, the remote computing device can transmit the notification to the mobile device, and the mobile device can receive the notification from the remote computing device that the event device has detected the event.

In response to receiving the notification from the control panel, a first timer can be started for the mobile device to acknowledge the detected event within a first threshold time limit. The first threshold time limit can be, for example, fifteen seconds. For instance, at 228, a determination can be made as to whether a user of the mobile device acknowledges the event within the first threshold time limit (e.g., fifteen seconds).

In response to receiving the notification from the control panel, the mobile device can display a prompt on the user interface for a user to acknowledge the event detected by the event device. At 230, in response to the user not having acknowledged the event within the first threshold time limit, the control panel can transition the alarm system from the conditional state to the alarm state. In the alarm state, the control panel can cause an alarm device to emit an alarm to notify occupants of the facility. Transitioning the alarm system to the alarm state when the user does not acknowledge the event within the first threshold time limit can ensure that if the event is in fact a true event, the alarm system notifies occupants of the facility (e.g., for evacuation, for moving to a safe space in the facility, etc.) even if the user does not acknowledge the event (e.g., the user may be preoccupied and not paying attention to the alarm system/mobile device).

In response to the user having acknowledged the event within the first threshold time limit, mobile device can cause the alarm system to remain in the conditional state (e.g., by acknowledging the event via the prompt on the user interface and the mobile device transmitting a signal to the control panel via the remote computing device). In some examples, the mobile device can transmit an acknowledgment notification to a different mobile device. For example, the mobile device can transmit the acknowledgment notification to other mobile devices associated with the facility. Such mobile devices may be associated with other users at the facility (e.g., site manager, operations personnel, etc.), emergency response personnel, etc. Accordingly, such users can be aware that the user of the mobile device is investigating whether the detected event is a true event or a false event.

In response to the user having acknowledged the event within the first threshold time limit, a second timer can be started for the mobile device to determine whether the event is a true event or a false event within a second threshold time limit. The second threshold time limit can be, for example, 180 seconds. For example, after acknowledging, at 228, the event, the user can transit from the user/mobile device's current location to the location of the detected event in the facility. The second threshold time limit can be longer than the first threshold time limit to allow the user time to reach the detected event to determine whether the event is a true event or a false event.

At 232, the control panel can determine whether the mobile device transmitted the signal within the second threshold time limit. The control panel can transition the system state of the alarm system based on whether the mobile device transmitted the signal within the second threshold time limit (e.g., 180 seconds), as is further described herein.

At 234, in response to the mobile device transmitting the signal within the second threshold time limit, the control panel can determine whether the signal indicates the event is a true event or a false event. For example, when the user is within a threshold distance of the event device (e.g., as is further described in connection with FIG. 3), the user interface of the mobile device can display a prompt to the user for the user to select whether the event is a true event or a false event.

Upon the user arriving at the location of the event device and transmitting a signal within the second threshold time limit (e.g., at 232) to the control panel via the remote computing device, and the control panel determines the signal indicates the event is a true event (e.g., at 234 the user selects the true event via the user interface of the mobile device), the control panel can transition the alarm system from the conditional state to the alarm state at 236. That is, the user can confirm the alarm condition, an alarm signal confirmation is transmitted to the control panel, and the control panel can cause the alarm device to emit an alarm to notify occupants of the facility of the event.

However, upon the user arriving at the location of the event device and transmitting a signal within the second threshold time limit (e.g., at 232) to the control panel via the remote computing device, and the control panel determines the signal indicates the event is a false event (e.g., at 234 the user selects the false event via the user interface of the mobile device), the control panel can transition the alarm system from the conditional state to the normal state at 238. That is, the user can determine there is no actual event occurring, mark the condition as safe, a safe signal confirmation is transmitted to the control panel, and the control panel can clear alarm signals and return the alarm system to the normal state.

As described above, the method 220 includes steps 232-238 that are performed in response to a user transmitting a signal within the second threshold time limit. That is, a user of the mobile device arrived at the location of the event and determined whether the event was a true event or a false event within the second threshold time limit. However, embodiments of the present disclosure are not so limited. For instance, in some examples, the user of the mobile device may not arrive at the location of the event device within the second threshold time limit, as is further described herein.

At 240, in response to the mobile device not transmitting the signal to the remote computing device within the second threshold time limit, the control panel can transition the alarm system from the conditional state to the alarm state. For example, the control panel may not receive a signal from the mobile device via the remote computing device within the second threshold time limit. In response, the control panel can transition the alarm system to the alarm state and cause the alarm device to emit an alarm to notify occupants of the facility. Transitioning the alarm system to the alarm state if the mobile device does not transmit a signal within the second time threshold (e.g., the user does not make it to the location of the event device within 180 seconds) can allow for occupants of the facility to be notified in case the event is a true event, allowing for occupants of the facility to evacuate.

In such an instance, the user can eventually arrive at the location of the event device in the facility. At 242, the user can still determine whether the event is a true event or a false event even while the alarm system is in the alarm state. For example, even if the alarm system is in the alarm state, the user can determine that the event is a false event. While the alarm device may still be emitting an alarm, it is a safer approach to emit an alarm in the case of a user of the mobile device not making it to the location of the event device when the event is a true event. When the user is within a threshold distance of the event device (e.g., as is further described in connection with FIG. 3), the user interface of the mobile device can display a prompt to the user for the user to select whether the event is a true event or a false event.

As such, at 244, if the event is the true event, the user can select the event is a true event via the user interface of the mobile device and the mobile device can transmit a signal (e.g., an alarm signal confirmation) to the control panel via the remote computing device indicating the event is a true event. Accordingly, the control panel can maintain the alarm state.

However, at 246, if the event is a false event, the user can select the event to be a false event via the user interface of the mobile device and the mobile device can transmit a signal to the control panel via the remote computing device indicating the event is a false event. Accordingly, the control panel can transition the alarm system from the alarm state to a normal state. That is, the user can determine there is no actual event occurring, mark the condition as safe, a safe signal confirmation is transmitted to the control panel, and the control panel can clear alarm signals and return the alarm system to the normal state.

Figure 3C:
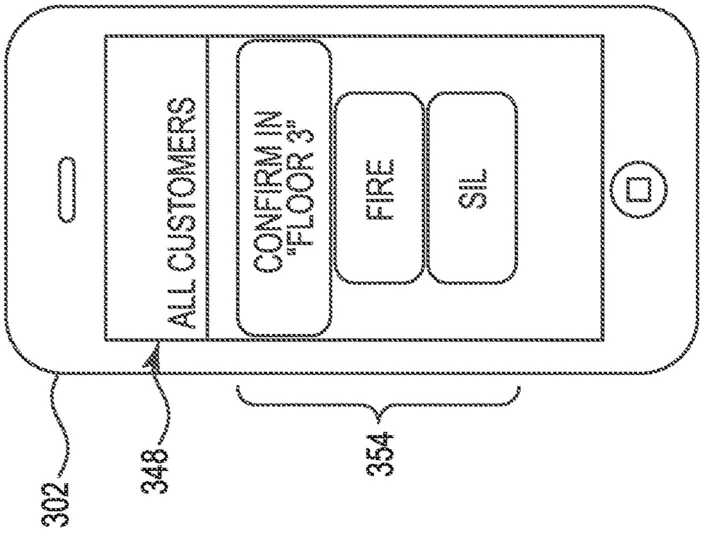
FIG. 3C is an example of a silence prompt on a user interface of a mobile device, in accordance with one or more embodiments of the present disclosure.
Figure 3B:
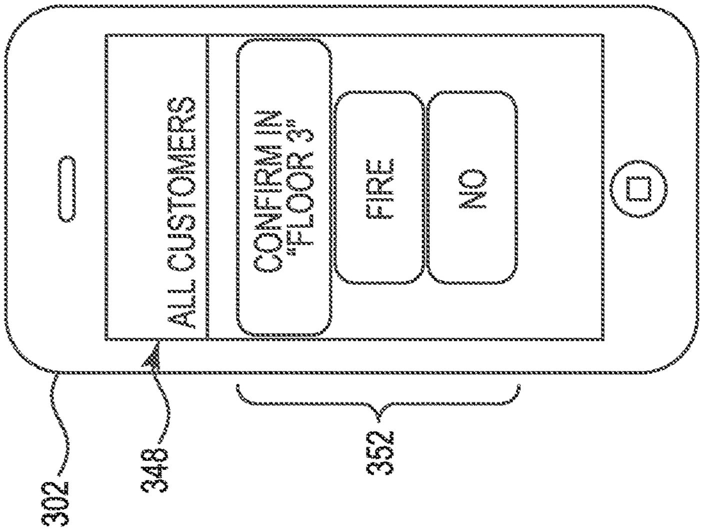
FIG. 3B is an example of a confirm prompt on a user interface of a mobile device, in accordance with one or more embodiments of the present disclosure.
Figure 3A:
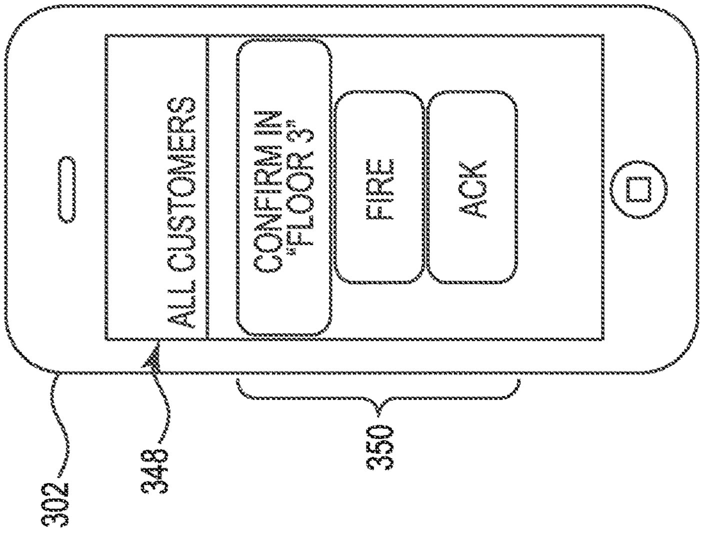
FIG. 3A is an example of an acknowledge prompt on a user interface of a mobile device, in accordance with one or more embodiments of the present disclosure.

FIG. 3A is an example of an acknowledge prompt 350 on a user interface 348 of a mobile device 302, in accordance with one or more embodiments of the present disclosure. The mobile device 302 can be, for example, mobile device 102, previously described in connection with FIG. 1.

As previously described above, the mobile device 302 can receive a notification from a control panel via a remote computing device that an event device has detected an event. The mobile device 302 can generate a prompt (e.g., acknowledge prompt 350) in response to the event device detecting the event. The user interface 348 can display the acknowledge prompt 350.

For example, an event device on floor 3 can detect a fire event and the mobile device 302 can display the acknowledge prompt 350. Utilizing the acknowledge prompt 350, the user can select "ACK" in order to acknowledge the detected fire event. In such an example, the alarm system can then maintain the conditional status of the alarm system while the user transits to the location of the detected event to verify whether the event is a true fire event or a false fire event, as is further described in connection with FIG. 3B. In response to the user not acknowledging the acknowledge prompt 350 within a first threshold time limit or the user selecting "FIRE", the control panel can transition the alarm system to the alarm state to notify occupants in the facility of the detected fire event.

FIG. 3B is an example of a confirm prompt 352 on a user interface 348 of a mobile device 302, in accordance with one or more embodiments of the present disclosure. The mobile device 302 can be, for example, mobile device 102, previously described in connection with FIG. 1.

In response to a user acknowledging the acknowledgment prompt, the user/mobile device can transit to the third floor of the facility (e.g., the location of the detected fire event) within a second threshold time limit. When the user is within a threshold distance of the event device, the mobile device 302 can generate a prompt (e.g., confirm prompt 352). The user interface 348 can display the confirm prompt 352.

The mobile device 302 can determine its position relative to the event device in various ways. For example, the event device can include a predetermined location in the facility. The mobile device 302 can utilize an Internet connection, mobile data connection, global positioning system (GPS) techniques, beacons located in the facility, among other location determination techniques to determine the location of the mobile device 302 relative to the location (e.g., predetermined location) of the event device.

Accordingly, when the mobile device 302 is within the threshold distance of the event device, the user can determine whether the detected fire event is a true event or a false event. In the example in which the detected fire event is a true event, the user can select "FIRE" and the mobile device 302 can transmit a signal indicating the event is a true event to the control panel via the remote computing device (e.g., within the second threshold period of time). In the example in which the detected fire event is a false event, the user can select "NO" and the mobile device 302 can transmit a signal indicating the event is a false event to the control panel via the remote computing device (e.g., within the second threshold period of time).

FIG. 3C is an example of a silence prompt 354 on a user interface 348 of a mobile device 302, in accordance with one or more embodiments of the present disclosure. The mobile device 302 can be, for example, mobile device 102, previously described in connection with FIG. 1.

In an example in which the user does not get to the location of the detected event within the second threshold period of time, the control panel can transition the alarm system from the conditional state to the alarm state, causing an alarm device to emit an alarm. When the user/mobile device does eventually get to the location of the detected event and the event is a false event, the user can select "NO" on the confirm prompt (e.g., previously described in connection with FIG. 3B), and the mobile device 302 can generate a silence prompt 354 on the user interface 348. Accordingly, if the user selects "SIL", the control panel can cause the alarm device to cease emitting the alarm. However, if the user selects "FIRE" (e.g., in an example in which the event is a true event), the control panel can maintain the alarm state of the alarm system.

Alarm system states, according to the present disclosure, can allow for a user to utilize a mobile device to acknowledge detected events of an alarm system. Such an approach can allow for reduced false alarms and risk related to actual true events, while utilizing fewer people for installation, commissioning, and/or maintenance of the alarm system, as compared with previous approaches.

Figure 4:
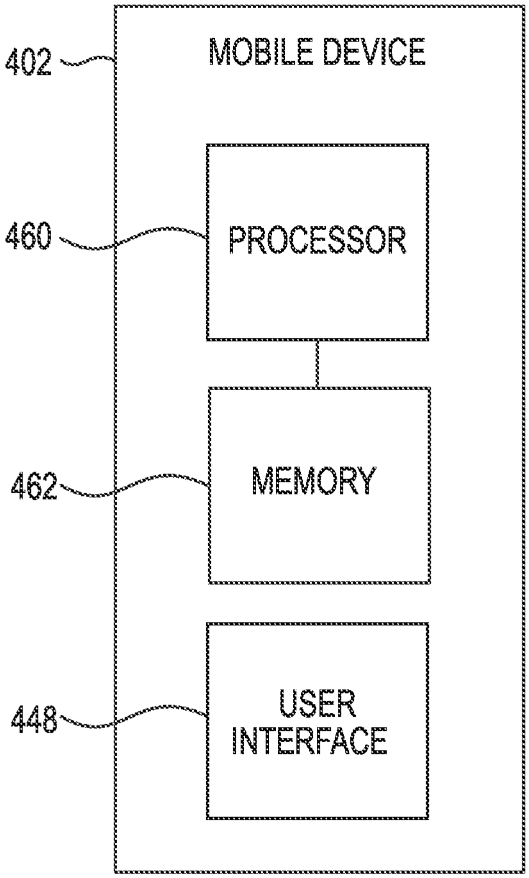
FIG. 4 is an example of a mobile device for alarm system states, in accordance with one or more embodiments of the present disclosure.

FIG. 4 is an example of a mobile device 402 for alarm system states, in accordance with one or more embodiments of the present disclosure. As illustrated in FIG. 4, the mobile device 402 can include a memory 462 and a processor 460 for alarm system states, in accordance with the present disclosure.

The memory 462 can be any type of storage medium that can be accessed by the processor 460 to perform various examples of the present disclosure. For example, the memory 462 can be a non-transitory computer readable medium having computer readable instructions (e.g., executable instructions/computer program instructions) stored thereon that are executable by the processor 460 for alarm system states in accordance with the present disclosure.

The memory 462 can be volatile or nonvolatile memory. The memory 462 can also be removable (e.g., portable) memory, or non-removable (e.g., internal) memory. For example, the memory 462 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 462 is illustrated as being located within mobile device 402, embodiments of the present disclosure are not so limited. For example, memory 462 can also be located internal to another computing resource (e.g., enabling computer readable instructions to be downloaded over the Internet or another wired or wireless connection).

The processor 460 may be a central processing unit (CPU), a semiconductor-based microprocessor, and/or other hardware devices suitable for retrieval and execution of machine-readable instructions stored in the memory 462.

As shown in FIG. 4, the mobile device 402 includes a user interface 448. For example, the user interface 448 can display various prompts, such as an acknowledge prompt, a confirm prompt, and/or a silence prompt (e.g., as previously described in connection with FIGS. 1-3). A user (e.g., operator) of the mobile device 402 can interact with the mobile device 402 via user interface 448. For example, user interface 448 can provide (e.g., display and/or present) information to the user of the mobile device 402, and/or receive information from (e.g., input by) the user of the mobile device 402. For instance, in some embodiments, user interface 448 can be a graphical user interface (GUI) that can provide and/or receive information to and/or from the user of the mobile device 402. The display can be, for instance, a touch-screen (e.g., the GUI can include touch-screen capabilities). Alternatively, a display can include a television, computer monitor, mobile device screen, other type of display device, or any combination thereof, connected to the mobile device 402 and configured to receive a video signal output from the mobile device 402.

User interface 448 can be localized to any language. For example, user interface 448 can display the system gateway analysis in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A mobile device for alarm system states, comprising:

a memory; and a processor configured to execute executable instructions stored in the memory to:

receive a notification from a remote computing device that an event device in an alarm system has detected an event, wherein in response to the alarm system detecting the event, the alarm system is in a conditional state;

acknowledge the event within a first threshold time limit to cause the alarm system to remain in the conditional state; and transmit a signal to the remote computing device within a second threshold time limit indicating whether the event is a true event or a false event, wherein the second threshold time limit is longer than the first threshold time limit; and a user interface configured to display the notification.

2. The mobile device of claim 1, wherein in response to the event being the true event, the processor is configured to execute the instructions to transmit a true event signal to the remote computing device to cause a control panel of the alarm system to transition the alarm system from the conditional state to an alarm state.

3. The mobile device of claim 2, wherein the true event signal is configured to cause an alarm device of the alarm system to emit an alarm.

4. The mobile device of claim 1, wherein in response to the event being the false event, the processor is configured to execute the instructions to transmit a false event signal to the remote computing device to cause a control panel of the alarm system to transition the alarm system from the conditional state to a normal state.

5. The mobile device of claim 1, wherein:

the processor is configured to execute the instructions to generate a prompt to acknowledge the event in response to the event device detecting the event; and the user interface is configured to display the prompt.

6. The mobile device of claim 1, wherein:

the processor is configured to execute the instructions to generate a prompt to transmit the signal; and the user interface is configured to display the prompt.

7. The mobile device of claim 6, wherein the processor is configured to execute the instructions to generate the prompt in response to the mobile device being within a threshold distance of the event device.

8. The mobile device of claim 1, wherein in response to acknowledging the event, the processor is configured to execute the instructions to transmit an acknowledgment notification to a different mobile device.

9. A system for alarm system states, comprising:

an alarm system including an event device and a control panel, wherein in response to the event device detecting an event, the control panel is configured to transition the alarm system from a normal state to a conditional state;

a remote computing device connected to the control panel, wherein the remote computing device is configured to receive a notification from the control panel in response to the event device detecting the event; and a mobile device connected to the remote computing device and including a user interface, wherein the mobile device is configured to:

receive a notification from the remote computing device that the event device has detected the event;

acknowledge the event to cause the alarm system to remain in the conditional state; and transmit a signal to the remote computing device indicating whether the event is a true event or a false event;

wherein the control panel is further configured to:

determine whether the mobile device acknowledged the event within a first threshold time limit; and in response to the mobile device having acknowledged the event within the first threshold time limit, determine whether the mobile device transmitted the signal within a second threshold time limit, wherein the second threshold time limit is longer than the first threshold time limit.

10. The system of claim 9, wherein in response to the mobile device not having acknowledged the event within the first threshold time limit, the control panel is configured to transition the alarm system from the conditional state to an alarm state.

11. The system of claim 9, wherein in response to the mobile device transmitting the signal within the second threshold time limit and the signal indicates the event is the true event, the control panel is configured to transition the alarm system from the conditional state to an alarm state.

12. The system of claim 9, wherein in response to the mobile device transmitting the signal within the second threshold time limit and the signal indicates the event is the false event, the control panel is configured to transition the alarm system from the conditional state to the normal state.

13. A method for alarm system states, comprising:

detecting, by an event device of an alarm system, an event;

transitioning, by a control panel of the alarm system, a system state of the alarm system from a normal state to a conditional state in response to the event being detected;

receiving, by a mobile device, a notification from a remote computing device connected to the control panel in response to the event being detected;

determining, by the control panel, whether the mobile device acknowledged the event within a first threshold time limit;

transmitting, by the mobile device, a signal to the remote computing device indicating whether the event is a true event or a false event;

determining, by the control panel in response to the mobile device having acknowledged the event within the first threshold time limit, whether the mobile device transmitted the signal within a second threshold time limit, wherein the second threshold time limit is longer than the first threshold time limit; and transitioning, by the control panel, the system state of the alarm system based on whether the mobile device transmitted the signal within the second threshold time limit.

14. The method of claim 13, wherein the method includes transitioning the alarm system from the conditional state to an alarm state in response to the mobile device not transmitting the signal to the remote computing device within the second threshold time limit.

15. The method of claim 14, wherein the method includes:

transmitting, by the mobile device, the signal indicating the event is the true event; and maintaining, by the control panel, the alarm state based on the mobile device not transmitting the signal to the remote computing device within the second threshold time limit.

16. The method of claim 14, wherein the method includes:

transmitting, by the mobile device, the signal indicating the event is a false event; and transitioning, by the control panel, the alarm system from the alarm state to a normal state based on the mobile device not transmitting the signal to the remote computing device within the second threshold time limit.

17. The method of claim 13, wherein the method includes causing, by the control panel, an alarm device of the alarm system to emit an alarm in response to the alarm system transitioning from the conditional state to an alarm state.

* * * * *